Nov. 21, 1961      H. A. BARBER      3,009,260
SELF-ADJUSTING SEALS FOR ROTARY DRIER DRUMS
Filed April 17, 1959
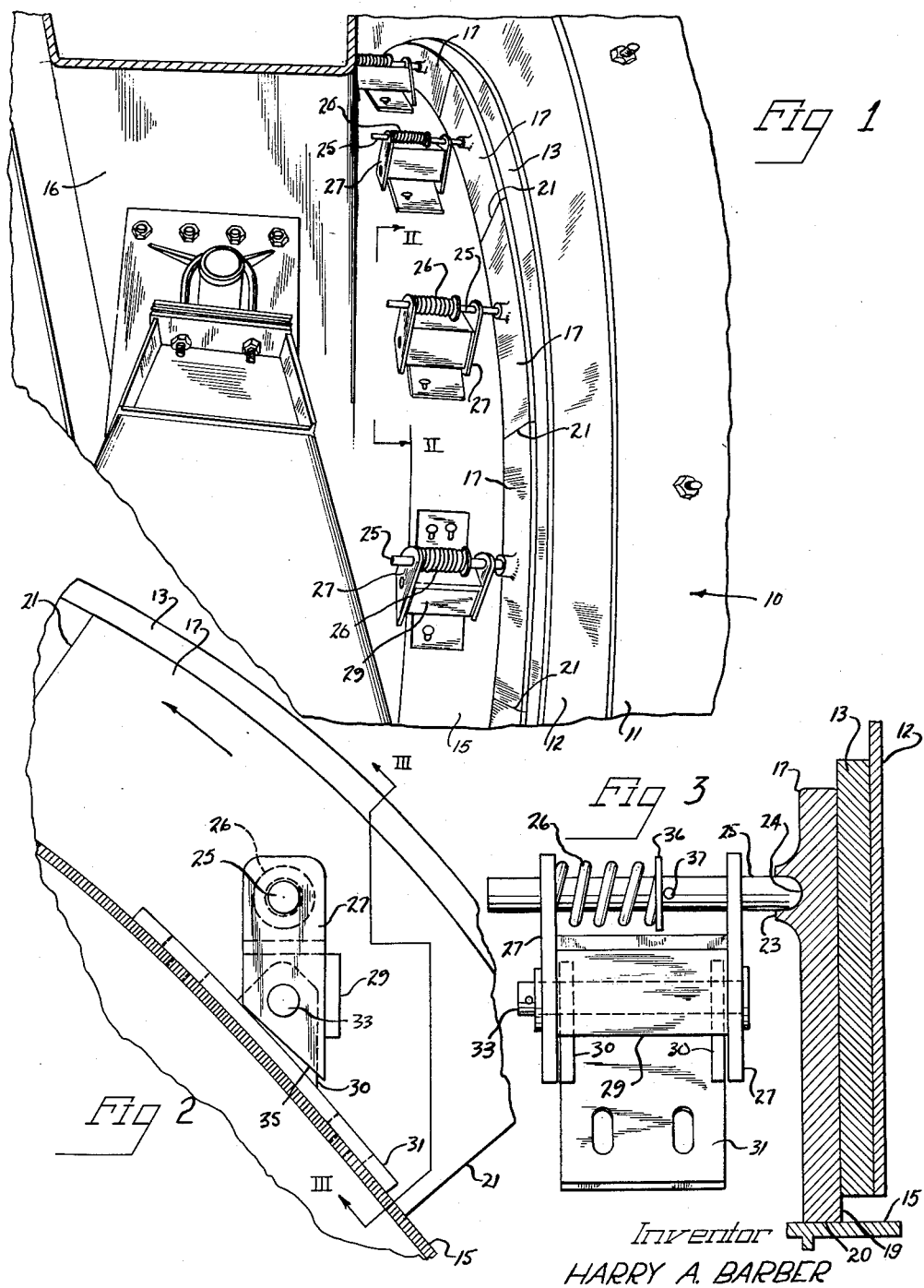
Inventor
HARRY A. BARBER
by Hill, Sherman, Meroni, Gross & Simpson Attys.

United States Patent Office 3,009,260
Patented Nov. 21, 1961

3,009,260
SELF-ADJUSTING SEALS FOR ROTARY
DRIER DRUMS
Harry A. Barber, Aurora, Ill., assignor to Barber-Greene
Company, Aurora, Ill., a corporation of Illinois
Filed Apr. 17, 1959, Ser. No. 807,066
3 Claims. (Cl. 34—141)

This invention relates to improvements in seals, and more particularly relates to an improved form of self-adjusting seal adapted for rotary drum types of aggregate driers.

In rotary drum types of aggregate driers, the drier drum rotates about a slightly inclined axis and the aggregate is supplied to the drum through the higher end thereof, and is lifted and tumbled as the hot gases are drawn through the drum from the low end thereof. With such types of driers, the heater supplying hot air for drying the aggregate is usually an oil heater and is located at the low end of the drum to accommodate the exhaust fan to draw the gases through the drum. In order to obtain the maximum degree of combustion efficiency the proper ratio of air to fuel must be maintained in the combustion area of the drier drum and since this area is located at the opposite end of the system from the exhaust fan, the fan must overcome the total resistance of the system, in order to provide the required volume of air for combustion.

Therefore, any openings or leakages in the system between the exhaust fan and the combustion area will decrease the volume of air at the combustion area and thereby reduce combustion and drier capacity.

Also, the exhaust fan of the drier conveys the hot gaseous products of combustion as well as a large volume of steam generated in the drying process with sufficient velocity to maintain a slight negative pressure within the drier drum, which during normal operation of the drier will prevent the escape of dust through all apertures or openings in the drier drum. When, however, the drier is operated at or near maximum capacities, the ratio of air to fuel is reduced to a minimum. Under these conditions, the propagation of combustion will create a slight positive pressure within the drier drum, resulting in the forcible ejection of dust and gases through any apertures in the drier drum. This action is commonly called "puffing" and results in the spilling of considerable amounts of dust and dirt in the area around the drier, creating an undesirable condition for the operating personnel and the machinery in the vicinity of the drier drum.

It has been attempted to remedy these deficiencies by sealing the ends of the aggregate drier by the use of a large wearing ring made up of one or more castings with laminated segments fastened to the rotary ends of the drum and shimmed or machined to mate with a similar ring or assembly held by the stationary ends of the drier. While such sealing methods effectively seal the drier, the initial cost of the seal as well as the maintenance of the seal renders such seals impractical.

A principal object of the present invention, therefore, is to remedy the foregoing deficiencies and to attain the proper air aggregate ratio in the combustion area of a rotary drum type of aggregate drier by providing simplified forms of self-adjusting articulated seals, sealing the ends of the drier drum and requiring a minimum of machining and fitting.

A further object of the invention is to provide a seal for the ends of a rotary drier drum, in which a number of small individual segments form a self-adjusting articulated sealing ring assembly for the ends of the drier drum.

Still another object of the invention is to provide an improved form of self-adjusting seal particularly adapted for aggregate drier drums and the like, in which a series of abutting segments conforming to the curvature of the stationary air plate for the drum are yieldably biased into contact with a rotary wearing surface of the drum and swivel to conform to the form of the air plate, by the friction between the wearing surface of the drum and the seal.

A still further object of the invention is to provide a self-adjusting seal, particularly adapted for rotary drier drums and the like, consisting in a plurality of individual segments arranged in end-to-end relation with respect to each other about the cylindrical air plate of the drum, and spring biased into engagement with a rotatable wearing surface at the end of the drum, in which individual rocking mountings on the air plate are provided for each segment, so arranged that the frictional contact between the segments and the wearing surface of the drum draws the segments into sealing engagement with the air plate, and thereby forms an effective seal between the stationary and moving parts of the drier drum.

These and other objects of the invention will appear from time to time as the following specification proceeds and with reference to the accompanying drawings wherein:

FIGURE 1 is a fragmentary perspective view of a portion of a drier drum, looking at the drum at the intake end thereof, and illustrating a self-adjusting seal constructed in accordance with the invention;

FIGURE 2 is a fragmentary sectional view taken substantially along line II—II of FIG. 1 and illustrating the mounting of one of the ring segments to the stationary air plate of the drier drum assembly; and FIG. 3 is a fragmentary sectional view taken substantially along line III—III of FIG. 2.

In the embodiment of the invention illustrated in the drawing, I have shown in FIG. 1 a fragment of the intake or charging end portion of a rotatable drier drum 10 having a generally cylindrical wall 11 and mounted for rotation about an inclined axis, inclinded downwardly from the receiving or charging end of the drum to the discharge end thereof at a relatively flat angle.

The drum 10 is mounted in a conventional manner on spaced rollers (not shown) forming a rolling support or cradle therefor. The drum 10 has an annular end wall 12 extending perpendicular to the axis of rotation of said drum and abutted at its outer side by a wearing ring 13 extending about said end wall along the open end of said end wall in radially spaced relation with respect to a stationary cylindrical air plate 15. The cylindrical air plate 15 is shown in FIGURE 3 as extending within the drum 10 in radially inwardly spaced relation with respect to the inner margins of the wearing ring 13 and the annular end wall 12. A suction blower (not shown) draws heated air through the drum from the discharge to the charging end thereof through a duct 16, partially shown in FIG. 1 and having communication with the interior of the drum 10 through the air plate 15.

The ring 13 may be made from a mild steel or like material and forms a wearing surface for an articulated ring in the form of a plurality of abutting ring segments 17, rockingly mounted on the stationary air plate 15, as will hereinafter be more clearly described.

The ring segments 17 may be made from various sealing materials, one material which has proved to give a satisfactory seal being cast iron. Each ring segment has a flat engaging face 19 engaging the wearing ring 13 and has an arcuate inner surface 20 conforming to the periphery of the stationary air plate 15. The ring segments 17 also have opposite end surfaces 21 conforming to radial lines extending through the center of rotation of the drum 10, to form a complete articulated ring, when the ring segments are retained in abutting engagement with each other.

Each ring segment 17 has an outwardly opening socket 23 formed integrally therewith, as by casting and having a rounded inner face 24 engaged by the rounded end of a plunger 25, pressed by a spring 26 to yieldably press the face 19 of the associated ring segment 17 into sealing engagement with the outer surface of the wearing ring 13.

The plunger 25 is slidably mounted on two parallel spaced rocking arms 27, connected together by a crossmember 29, and pivotally mounted on spaced supports or ears 30, extending upwardly from a plate 31, adjacent opposite sides thereof. A pivot pin 33 pivotally mounts the rocking arms 27 on the ears or supports 30. The plate 31 is in turn riveted or otherwise secured to the outer surface of the air plate 15.

The inner ends of the arms 27 are shown as being beveled or inclined, as indicated by reference character 35, and generally conforming to the surface of the plate 31. The axis of the pivot pin 33 is so located with respect to the beveled inner end portions of the arms 27, that the forward end portions of said beveled inner end portion will come into engagement with the surface of the plate 31, and limit inward movement of the arms 27 beyond a position where the arcuate surfaces 20 of the shoes 17 are engaged with the air plate 15 with sufficient force to form an effective seal.

The spring 26 is shown in FIG. 3 as being seated at one end on the inner side of an outer arm 27, and as being seated at its opposite end on a washer 36, retained in position on the plunger 25, as by a retainer pin 37.

The arrow in FIG. 2 indicates the direction of rotation of the drier drum 10 and wearing plate 13. It may be seen from this figure that the springs 26 force the inner faces 19 of the sealing segments 17 into sealing engagement with the outer face of the wearing ring 13. Thus, as the drum 10 rotates in the direction shown in FIG. 2, the friction between the sealing segments 17 and the face of the wearing ring 13 will pivot the rocking arms 27 in the direction of rotation of the drier drum and bring the arcuate sealing surfaces 20 of the ring segments 17 into sealing engagement with the cylindrical face of the air plate 15. The rocking arms 17 thus are so positioned as to be pivoted in the direction of rotation of the drum 10 by the friction between the sealing segments 17 and the wearing plate 13, determined by the loading of the springs 26.

The sealing or ring segments 17 being individually supported and spring pressed into engagement with the outer surface of the wearing ring 13 are thus continually in engagement with the wearing surface 13 and the air plate 15 and adjust themselves to the irregularities of the rotating wearing ring 13 as well as the stationary air plate 15.

It should here be understood that the ring segments 17 may be mounted on the discharge as well as the intake end of the drier drum 10, and are usually mounted on both ends of the drum.

While I have herein shown and described one form in which my invention may be embodied, it may readily be understood that various modifications and variations in the invention may be attained without departing from the spirit and scope of the novel concepts thereof.

I claim as my invention:

1. In a rotatable drier drum having a generally cylindrical wall portion mounted for rotation about an axis extending longitudinally of said drum and having an annular end wall extending inwardly of said cylindrical wall portion perpendicular to the axis of rotation of said drum, an air plate spaced radially inwardly of the inner periphery of said annular end wall and concentric therewith, stationary support means for said air plate and retaining said air plate from rotational movement, and means sealing the space between said air plate and said annular end wall comprising a plurality of sealing segments extending about said end wall in end-to-end relation with respect to each other and having inner marginal portions conforming to the form of said air plate for sealing engagement therewith, an individual rockable mounting member for each sealing segment rockingly mounted on said air plate for rocking movement about axes extending parallel to the axis of rotation of said drum, pivot members pivotally mounted on said rockable mounting members in radially spaced relation with respect to the axes of rocking movement of said rockable mounting members and having pivotal bearing engagement with said sealing segments and spring means pressing said pivot members into engagement with said sealing segments and pressing said sealing segments into engagement with said annular end wall whereby the frictional resistance created between said annular end wall and said sealing segments upon rotation of said drum will rockingly move said mounting means toward said air plate and move said sealing segments into position to maintain a seal between said annular end wall and said air plate.

2. In a rotatable drier drum having a generally cylindrical wall supported for rotational movement about an axis extending longitudinally of said drum and having an annular end wall extending inwardly of said cylindrical wall and perpendicular thereto, a cylindrical air plate spaced radially inwardly of said annular end wall and extending inwardly of said end wall, stationary support means for said air plate supporting said air plate independently of said drier drum, and means sealing the space between said air plate and said annular end wall comprising a plurality of sealing segments having inner surfaces generally conforming to the form of the outer periphery of said air plate and having plane engaging faces having abutting engagement with said annular end wall, individual rockable supports for said sealing segments rockingly mounted on said air plate for movement about axes parallel to the axis of rotation of said drum, spring pressed plungers mounted on said rockable supports in outwardly spaced relation with respect to the axes of rocking movement of said rockable supports and having pivotal bearing engagement with said segments and biased to bias said segments into engagement with said end wall, whereby the friction created by engagement of said segments with said end wall upon rotation thereof will effect rocking movement of said rockable supports in directions to bring the inner surfaces of said segments into sealing engagement with said air plate.

3. In a rotatable drier drum having a generally cylindrical wall, rolling support means for said wall supporting said cylindrical wall for rotational movement about an axis extending longitudinally of said drum, said drier drum also having an annular end wall extending inwardly of said cylindrical wall, a cylindrical air plate spaced radially inwardly of the inner margin of said annular end wall and extending within said annular end wall, support means for said air plate retaining said air plate from rotation with said drum, an articulated annular seal sealing the space between said air plate and said annular end wall comprising a plurality of sealing segments mounted in end-to-end relation with respect to each other and having engagement with said annular end wall and having inner surfaces conforming to the cylindrical outer surface of said inner plate, individual rocking supports for said sealing segments pivotally mounted on said air plate for pivotal movement about axes extending parallel to the axis of rotation of said drier drum, individual plungers slidably mounted in said rocking support in outwardly spaced relation with respect to the axes of rocking movement thereof and having pivotal bearing engagement with said sealing segments, and springs encircling said plungers and reacting against said rocking supports and biasing said plungers in directions to maintain said sealing segments in engagement with said annular end wall, whereby the friction created between said sealing segments and said annular end wall upon rotation of said drum will effect rocking movement of said rockable supports toward said air plate and bring the inner surfaces of said sealing segments into sealing engagement with said air plate.

References Cited in the file of this patent
UNITED STATES PATENTS

| | | |
|---|---|---|
| 2,557,422 | Fieux | June 19, 1951 |
| 2,778,696 | Lease | Jan. 22, 1957 |
| 2,904,896 | Forest et al. | Sept. 22, 1959 |